United States Patent [19]

Rumanowski

[11] 3,725,452

[45] Apr. 3, 1973

[54] BENZYL-N-(N-BUTYL) CHLOROPHENOXYTHIOBU-TYRIMIDATES

[75] Inventor: Edmund J. Rumanowski, Denver, N.J.

[73] Assignee: Allied Chemical Corporation, New York, N.Y.

[22] Filed: Aug. 9, 1971

[21] Appl. No.: 170,354

Related U.S. Application Data

[62] Division of Ser. No. 863,011, Sept. 24, 1969, Pat. No. 3,628,944.

[52] U.S. Cl. ........................... 260/453 R, 260/551 R
[51] Int. Cl. ............................................. C07c 119/20
[58] Field of Search ....................... 260/453 R; 71/98

[56] References Cited

UNITED STATES PATENTS

| | | | |
|---|---|---|---|
| 3,268,539 | 8/1966 | Levy | 260/453 R |
| 2,412,510 | 12/1946 | Jones | 71/98 |
| 2,811,526 | 10/1957 | Burtner | 260/453 R |

FOREIGN PATENTS OR APPLICATIONS

| | | | |
|---|---|---|---|
| 639,645 | 5/1964 | Belgium | 71/98 |

*Primary Examiner*—Lewis Gotts
*Assistant Examiner*—G. Hollrach
*Attorney*—John J. Lipari

[57] ABSTRACT

Benzyl-N-(n-butyl)-chlorophenoxythiobutyrimidates are prepared by reacting N-(n-butyl)-di- or trichlorophenoxythiobutyramide with benzyl bromide in the presence of sodium alkylate. The compounds are useful as herbicides.

3 Claims, No Drawings

BENZYL-N-(N-BUTYL) CHLOROPHENOXYTHIOBUTYRIMIDATES

This is a division of application Ser. No. 863,011 filed Sept. 24, 1969 now U.S. Pat. No. 3,628,944.

BACKGROUND OF THE INVENTION

This invention relates to novel chlorophenoxythiobutyrimidates; in particular, it relates to benzyl-N-(n-butyl)-chlorophenoxythiobutyrimidates, their preparation and use as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant, for example corn and wheat, being cultivated.

SUMMARY OF THE INVENTION

The novel compounds of the instant invention are di- and trichlorophenoxythiobutyrimidates of the formula:

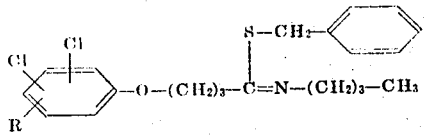

wherein R is hydrogen or chlorine.

The compounds are prepared by reacting N-(n-butyl)-di- or trichlorophenoxythiobutyramides with benzyl bromide to form the corresponding benzyl-N-(n-butyl)-di- or trichlorophenoxythiobutyrimidates. The novel compounds are useful as herbicides.

DETAILED DESCRIPTION OF THE INVENTION

The novel compounds of the present invention are normally prepared by reacting N-(n-butyl)chlorophenoxythiobutyramide with benzyl bromide in the presence of an equivalent amount of sodium methylate, according to the following sequence:

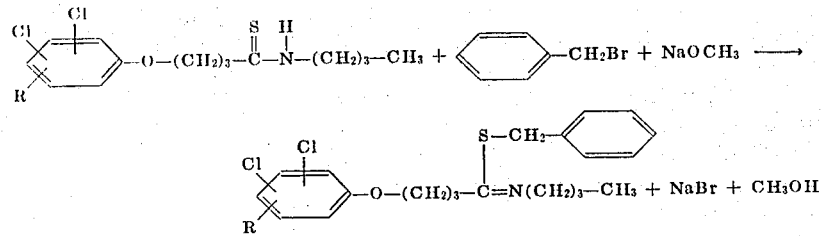

wherein R is hydrogen or chlorine.

Approximately equimolar amounts of the two substrates are used, although an excess of benzyl bromide is preferably used to achieve a higher yield with respect to the other substrates. The reaction may be conducted without use of an inert solvent, although it is more convenient to use a solvent such as methanol or ethanol. Preferably, the reaction is conducted at a temperature within the range of about 35 to 70°C. Reaction times as short as about one-half hour or less have been found to be adequate, although longer reaction times may be used, if desired. Atmospheric pressure is normally used for the reaction.

Substrate materials are available by procedures taught in the prior art. For example, the various chlorophenoxythiobutyramides may be prepared by reacting the appropriate chlorophenoxybutyronitrile with alcoholic solution of ammonia and hydrogen sulfide [Blank, Berichte, 25, 3043 (1892)]. Benzyl bromide is available commercially. The corresponding N-(n-butyl)-chlorophenoxythiobutyramides may be prepared by reacting the thiobutyramides with n-butylamine.

The instant compounds have been found to be unexpectedly effective herbicides in that they are very harmful to plants normally considered undesirable, such as rape and broadleafed weeds, while being harmless toward corn. Benzyl-N-(n-butyl)-2,4-dichlorophenoxythiobutyrimidate is the preferred compound for this purpose.

Normally, the instant compounds are used as the active ingredient in a herbicidal composition, although they may also be used without a carrier. Various diluents and carriers may be employed and the percent of active ingredient may be varied. Although compositions with less than about 0.5 percent by weight of active ingredient may be used, it is preferable to use compositions containing at least about 1.0 percent of active ingredient, since otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition may be applied to provide about 8 to 16 pounds of active ingredient per acre.

The instant herbicidal compositions may be in the form of a solution, with the solvent being selected from acetone, methylene chloride, and the like. The solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application of the composition can also be achieved by dusting a powder in which the active ingredient is dispersed. Suitable carriers include finely powdered material such as clays, fullers earth, talc, etc.

The instant compounds may constitute the sole active ingredient in the herbicidal compositions, yet can be effectively used in combination with other active ingredients, such as other herbicides, insecticides and other plant treating agents.

The following examples are provided to more fully illustrate the instant invention. They are provided for illustrative purposes only and are not to be construed as limiting the scope of the instant invention, which is defined by the appended claims.

EXAMPLE I

Preparation of Benzyl-N-(n-Butyl)-2,4-Dichlorophenoxythiobutyrimidate

Sixteen grams of N-(n-butyl)-2,4-dichlorophenoxythiobutyramide and 9.4 grams of benzyl bromide were mixed in a 100-ml 3-necked flask containing 60 ml absolute ethanol. The flask was fitted with a reflux condenser, stirrer, and a thermometer. About 3 grams of sodium methylate in 20 ml absolute ethanol were then added slowly with stirring to the mixture over a period of 10 to 15 minutes. The temperature was maintained between 45° to 50°C. during the addition of the sodium methylate. The mixture was then heated at 45° to 55°C. with stirring for another 30 minutes. Water was then added to the mixture and the solution was extracted with 100 ml of methylene chloride. The extract was washed with water and dried over anhydrous magnesium sulfate. The solvent was then stripped.

Yield: 18 grams of viscous oil

Analysis

|     | Calculated | Found |
| --- | --- | --- |
| %C: | 62.8 | 63.0 |
| %H: | 6.2 | 7.1 |

EXAMPLE II

The procedure of Example I was repeated using an equivalent amount of appropriate di- or trichlorophenoxythiobutyramide in place of said 2,4-dichlorophenoxythiobutyramide to afford the following products.

Benzyl-N-(n-butyl)-2,5-dichlorophenoxythiobutrimidate

Benzyl-N-(n-butyl)-2,6-dichlorophenoxythiobutyrimidate

Benzyl-N-(n-butyl-3,5-dichlorophenoxythiobutyrimidate

Benzyl-N-(n-butyl)-2,4,5-trichlorophenoxythiobutyrimidate

Benzyl-N-(n-butyl)-2,4,6-trichlorophenoxythiobutyrimidate

Benzyl-N-(n-butyl)-3,4,5-trichlorophenoxythiobutyrimidate

EXAMPLE III

Herbicidal Activity

The following crop species and weed species were planted in metal flats (12 × 8.5 × 4 inches) in greenhouse potting soil containing one-third mixed clay and sand, one-third mushroom soil, and one-third peat moss. The pH of the soil was 6.8 to 7.2.

Crop Species

Corn, Zea mays, Hybrid US 13
Wheat, Triticum vulgare, variety Thorne
Cotton, Gossypium hirsutum, variety Delta Pine Land Fox No. 20
Soybean, Soja wax, variety Wilson Weed Species Rape, Brassica napus Each flat received a volume of spray equal to 80 gallons per acre of an acetone solution of benzyl-N-(n-butyl)-2,4-dichlorophenoxythiobutyrimidate. The concentration of the solution was adjusted to provide application of 16 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed eight to ten days after seeding in the postemergence tests. Results were observed fourteen days after spraying.

The effect of the herbicide was evaluated in terms of the injury rating index scale, ranging from 0 to 10 as follows:

0 — No apparent injury
1,2,3 — Slight injury
4,5,6 — Moderate injury
7,8,9 — Severe injury (plants will die)
10 — Plants were dead An injury rating of 3 is the maximum tolerated for crops and a rating of 7 is the minimum acceptable on weed plants.

Injury Rating at 16 Pounds Per Acre

| Plant | Postemergence |
| --- | --- |
| Corn | 1 |
| Cotton | 10 |
| Wheat | 4 |
| Soybean | 10 |
| Rape | 10 |

I claim:

1. Compound of the formula:

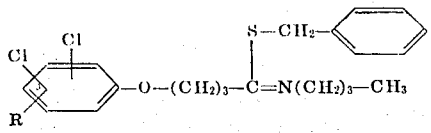

wherein R is hydrogen or chlorine.

2. Compound of claim 1 wherein R is hydrogen.

3. A compound of claim 1 which is benzyl-N-(n-butyl)-2,4-dichlorophenoxythiobutyrimidate.

* * * * *